July 9, 1968 J. SCHIFFERS 3,391,594
DEVICE FOR SECURING UNITS CONSISTING OF A SHEAR BLADE AND A
SHEATH TO THE UPPER AND LOWER BLADE BEAMS OF
PLATE-SHEARING MACHINES
Filed Jan. 25, 1966 2 Sheets-Sheet 1

United States Patent Office 3,391,594
Patented July 9, 1968

3,391,594
DEVICE FOR SECURING UNITS CONSISTING OF A SHEAR BLADE AND A SHEATH TO THE UPPER AND LOWER BLADE BEAMS OF PLATE-SHEARING MACHINES
Josef Schiffers, Rheindahlen, Germany, assignors to Schloemann Aktiengesellschaft, Dusseldorf, Germany, a company of Germany
Filed Jan. 25, 1966, Ser. No. 522,972
Claims priority, application Germany, Jan. 26, 1965, Sch 36,431
4 Claims. (Cl. 83—698)

ABSTRACT OF THE DISCLOSURE

A device for securing units, each consisting of a shear blade and a sheath, to the upper and lower blade beams of plate-shearing machines, comprising: hooks fastened on the back of the sheath, at a distance from that wall of the blade beam which is in contact with the sheath, clamping wedges inserted into the spaces between the hooks and the said blade beam wall in a direction parallel to the blades, spring means urging the wedges in the direction of insertion, and means for releasing the clamping wedges against the thrust of the spring means. The clamping wedges may be attached to thrust rods, and provided with hydraulic means for displacing the thrust rods so as to release the wedges.

---

Figure 1:
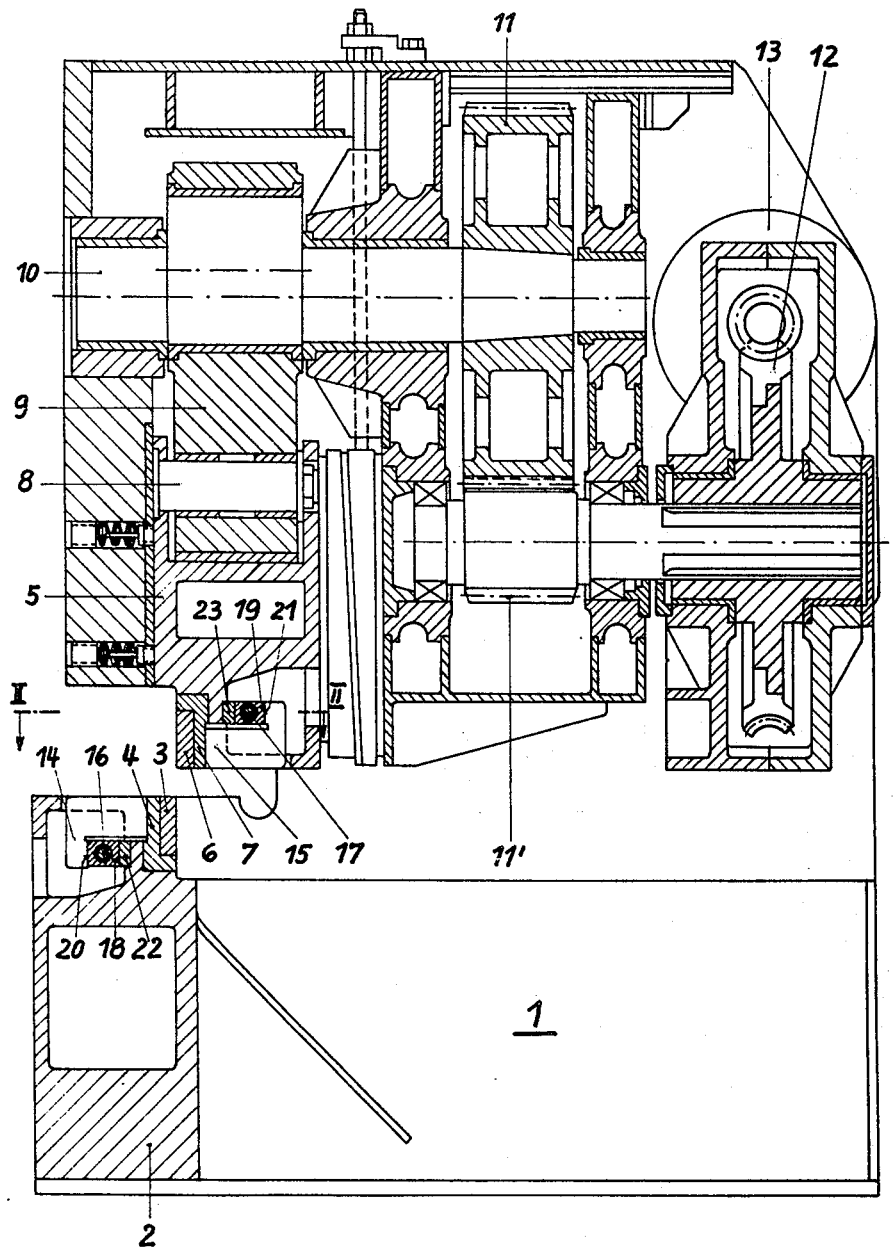

In plate-shearing machines it is known to secure the units, each consisting of a blade and a sheath, in the shear saddles, by means of screw-threaded bolts and nuts. For changing a blade these connections have to be released each time by hand.

A sheet-metal shearing machine is already known in which, on the sheath strip, projections are provided, which are slidable in grooves in the shear saddle, and which, in the pushed-in position, can be secured by means of a screw-threaded bolt extending in the shearing direction. In this apparatus also, for securing and releasing the sheath, manual work is required, which, in the case of a wide blade with a plurality of bolts, requires a correspondingly large amount of time, and in which the operator has to have access to the shearing machine.

With the present invention, the change of blade, on the lower or upper shear saddle, can be more quickly effected, so as to shorten the stoppage thereby required in the shearing line. Moreover an attempt is made to render the operation automatic, with a view to obviating the need to climb into the shearing machine.

According to the invention this result is attained by arranging on the blade beam a clamping connection, subject to spring pressure in the holding position, between the blade beam and the sheath, this connection being releasable against the spring pressure.

In a further development of the invention, holding means arranged on the sheath-piece can be clamped to the blade beam by means of wedge-pieces slidably supported on the blade beam and subjected to spring pressure. By this means a reliable connection is provided between the blade beam and the blade units, and this connection is simply and quickly releasable for the purpose of changing the blade.

A further improvement is obtained by providing hooks, on the rear of the sheath, these hooks engaging at a distance behind that wall of the blade beam which forms the bearing surface for the sheath, and by inserting into the recesses, which taper in a direction parallel to the direction of the blade, between the blade-beam wall and the hooks, clamping wedges, which are secured upon a spring-controlled thrust rod. This construction ensures, over the entire breadth of the blade, a reliable bearing of the blade unit on the blade beam, since the number of points of connection can be adapted to the breadth of the blade.

According to a further feature of the invention, there is associated with the clamping wedges of each blade a displacing device acting against spring force, preferably a hydraulic cylinder, the piston rod of which can be connected with the clamping wedges. In this way the release of the connection can be effected from the control stand, thereby obviating the manual labour hitherto required.

It is furthermore advantageous that the hydraulic cylinder co-operating with the movable blade, though secured to the stand, can be brought, by the movement of the blade beam, into a position of alignment with the associated thrust rod, so that movable pipes for the pressure liquid can be obviated.

The hydraulic cylinder may however alternatively be arranged in the blade beam, and connected with the thrust rod by an intermediate member. In this case the connection between the blade unit and the upper blade beam is releasable independently of any particular position thereof.

Figure 2:
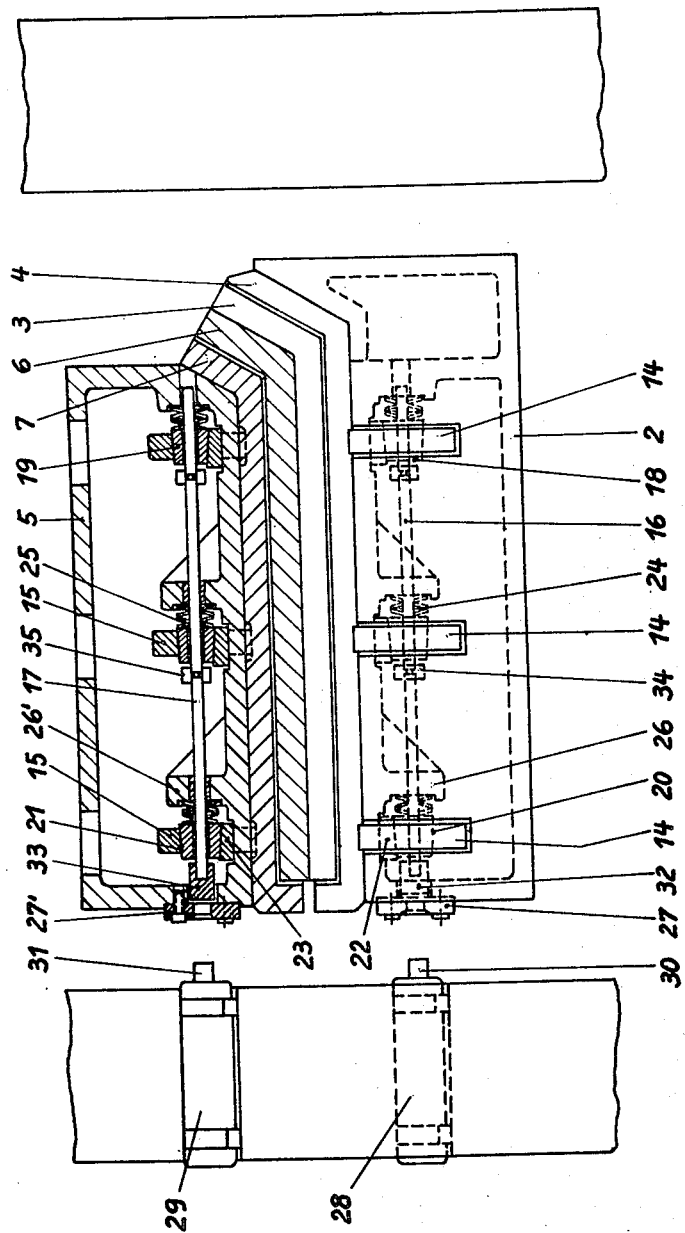

One embodiment of the invention is illustrated by way of example in the accompanying drawings, in which:

FIGURE 1 shows a vertical section through a plate-shearing machine, with fastening devices according to the invention for the upper and lower blade beams; and FIGURE 2 is a plan view on a larger scale, with a horizontal section through the fastening device on the upper blade beam.

The shearing machine illustrated in FIGURE 1 consists of a lower blade beam 2 connected with a stand 1, the lower blade 3 being arranged in a sheath 4 on this blade beam. An upper blade beam 5 is vertically displaceable on the stand 1, and accommodates on its under side the upper blade 6, with its sheath 7. The upper blade beam 5 is connected by a bolt 8 with a ram 9, which is mounted upon a crank-shaft 10, which, through the medium of spur wheels 11 and 11' and a worm gear 12, is driven by a motor 13.

For securing the units, consisting of blade and sheath, to the blade beams 2 and 5, hooks 14 and 15 are provided on the outside of the sheaths that is to say, on the side of the sheath remote from the blade, and these hooks extend into recesses in the individual blade beams, and engage, at a distance, behind the wall portion of the blade beam that bears against the back of the sheath. Into the intervening spaces thereby formed, between the hooks 14 or 15 and the inner side of the said wall portion of the blade beam, are inserted clamping wedges 18 or 19, secured upon a thrust rod 16 or 17 supported parallel to the blade in the blade beam. The vertical inner surfaces 20 and 21 of the hooks 14 and 15 respectively are inclined. The other bearing surfaces for the clamping wedges 18 and 19 are constituted by correspondingly inclined plates 22 and 23, secured to the inner side of the blade-beam wall so that the spaces between the surfaces 20 and the plates 22, and between the surfaces 21 and the plate 23, are convergent.

Upon the thrust rods 16 and 17 are arranged columns of disc or cup springs 24 and 25 respectively, bearing on the base surfaces of the clamping wedges 18 and 19. The columns of disc springs bear, under initial stress, on guiding eyes 26 and 26', which are provided on the inner side of the blade-beam wall.

The hooks 14 and 15, and the sheaths 4 and 7 connected with them, are firmly clamped, by the spring-pressed clamping wedges 18 and 19, over their entire breadth, to the blade beams 2 and 5 respectively. In order that the thrust rods 16 and 17, when the sheaths 4 and 7 are removed, may not protrude out of the blade beams 2 and 5 under the action of the cup springs 24 and 25, the bearing apertures located in this direction are closed by cover plates 27 and 27' secured to the blade beams 2 and 5 respectively.

For releasing the connections, hydraulic cylinders 28 and 29 are arranged on the stand for the lower blade beam 2 and for the upper blade beam 5 respectively, the piston rod 30 of the lower hydraulic cylinder 28, being permanently directed towards the thrust rod 16, and the piston rod 31 of the upper hydraulic cylinder 29 being capable of being brought into alignment with the upper thrust rod 17 by displacing the upper blade beam 5.

The piston rods 30 and 31, when pressure liquid is admitted to the hydraulic cylinders 28 and 29, pass through apertures in the cover plates 27 and 27', and come into contact with heads 32 and 33 secured to the thrust rods 16 and 17, and move these thrust rods against the force of the disc-spring cloumns 24 and 25. In this way the heads 32 and 33 of the thrust rods, and releasing rings 34 and 35 secured upon the thrust rods 16 and 17, press upon the head surfaces of the clamping wedges 18 and 19, and remove them from their holding positions.

I claim:

1. A device for securing units each consisting of a shear blade and a sheath to the upper and lower saddles of plate-shearing machines, comprising: upper and lower blade beams, hooks secured to the back of each sheath at a distance from the wall portion of the blade beam that bears against the sheath, clamping wedges inserted into the spaces between the said wall portion of the blade beam and the hooks, the said spaces tapering in the direction of insertion of the clamping wedges, spring means urging the wedges in the direction of insertion, and means for releasing the wedges against the thrust of the spring means.

2. A device as claimed in claim 1, further comprising: a thrust rod secured to the clamping wedges, and means for displacing the thrust rod and the clamping wedges against the thrust of the said spring means.

3. A device as claimed in claim 2, the means for displacing the clamping wedges being two hydraulic piston-and-cylinder units, each associated with one of the blade beams, the piston rods of these cylinders being adapted, when energized, to exert a thrust upon the thrust rods carrying the clamping wedges in opposition to the action of the spring means.

4. A device as claimed in claim 2, the thrust rod being longitudinally movable in the upper blade beam in a direction parallel to the blade, and the thrust rod being adapted to be brought into alignment with the associated piston-and-cylinder unit by vertical displacement of the upper blade beam.

References Cited

UNITED STATES PATENTS 2,374,625  4/1945  Slettengren _____ 83—694

FOREIGN PATENTS 971,006  6/1950  France.

ANDREW R. JUHASZ, *Primary Examiner.*